United States Patent
Brassette

(10) Patent No.: US 9,321,168 B2
(45) Date of Patent: Apr. 26, 2016

(54) LEGLESS PORTABLE WORKTABLE

(71) Applicant: Duane J. Brassette, Lake Charles, LA (US)

(72) Inventor: Duane J. Brassette, Lake Charles, LA (US)

(*) Notice: Subject to any disclaimer, the term of this patent is extended or adjusted under 35 U.S.C. 154(b) by 0 days.

(21) Appl. No.: 14/849,344

(22) Filed: Sep. 9, 2015

(65) Prior Publication Data

US 2016/0082584 A1    Mar. 24, 2016

Related U.S. Application Data

(60) Provisional application No. 62/054,042, filed on Sep. 23, 2014.

(51) Int. Cl.
| | |
|---|---|
| *A47B 23/00* | (2006.01) |
| *B25H 1/04* | (2006.01) |
| *F16B 2/18* | (2006.01) |
| *B25H 1/00* | (2006.01) |
| *F16B 2/10* | (2006.01) |

(52) U.S. Cl.
CPC ................ *B25H 1/04* (2013.01); *B25H 1/0064* (2013.01); *F16B 2/10* (2013.01); *F16B 2/185* (2013.01)

(58) Field of Classification Search
CPC .... A47B 96/02; A47B 96/063; A47B 96/065; A47B 96/061; A47B 5/02
USPC ......... 108/42, 47, 49, 46, 152; 248/236, 74.2, 248/229.26, 226.11, 228.6, 231.51, 316.1, 248/316.5, 316.6, 235, 245
See application file for complete search history.

(56) References Cited

U.S. PATENT DOCUMENTS

| | | | | |
|---|---|---|---|---|
| 585,406 | A * | 6/1897 | Rhind | F16M 11/12 24/514 |
| 1,316,031 | A * | 9/1919 | Hartig | A47B 77/022 108/152 |
| 3,409,954 | A * | 11/1968 | Schneider | B01L 9/50 248/316.5 |
| 3,829,051 | A * | 8/1974 | Emmons | E06C 7/14 108/152 |
| 5,205,222 | A * | 4/1993 | Bernard | D06F 79/02 108/42 |
| 6,688,238 | B1 * | 2/2004 | Alexiou | A47K 3/281 108/42 |
| 6,779,919 | B1 * | 8/2004 | Staniforth | G01K 1/143 248/231.51 |
| 6,910,429 | B1 * | 6/2005 | Matay | B25H 3/06 108/152 |
| 6,984,066 | B2 * | 1/2006 | Borom | A61B 6/0442 108/42 |
| 7,159,832 | B2 * | 1/2007 | Easterling | A61G 15/10 24/455 |
| D692,132 | S * | 10/2013 | Damron | D24/128 |
| 8,671,847 | B2 * | 3/2014 | Lymberis | A01M 31/02 108/42 |
| 9,089,208 | B2 * | 7/2015 | Zimmerman | A47B 23/02 |

OTHER PUBLICATIONS instructables.com. Online.Adjustable Welding/Bike Worktable. Instructables. Online on or before Jul. 27, 2015. Retrieved from the Internet: Oct. 29, 2015.<URL: http://www.instructables.com/id/Adjustable-WeldingBike-Worktable/>.

* cited by examiner

*Primary Examiner* — Jose V Chen
(74) *Attorney, Agent, or Firm* — Patentfile, LLC; Bradley C. Fach; Steven R. Kick

(57) ABSTRACT

A legless portable worktable is provided for supporting a tray above the ground without the use of ground contacting legs. In some embodiments, the worktable may comprise: a tray having a tray surface; a conduit clamp coupled to the tray with the conduit clamp comprising a first arm movably coupled to a second arm; a first contact member coupled to the first arm of the conduit clamp; a second contact member and a third contact member coupled to the second arm of the conduit clamp. The first, second, and third contact members may be configured to make contact with and grip a conduit thereby supporting the weight of the tray above the ground.

8 Claims, 6 Drawing Sheets

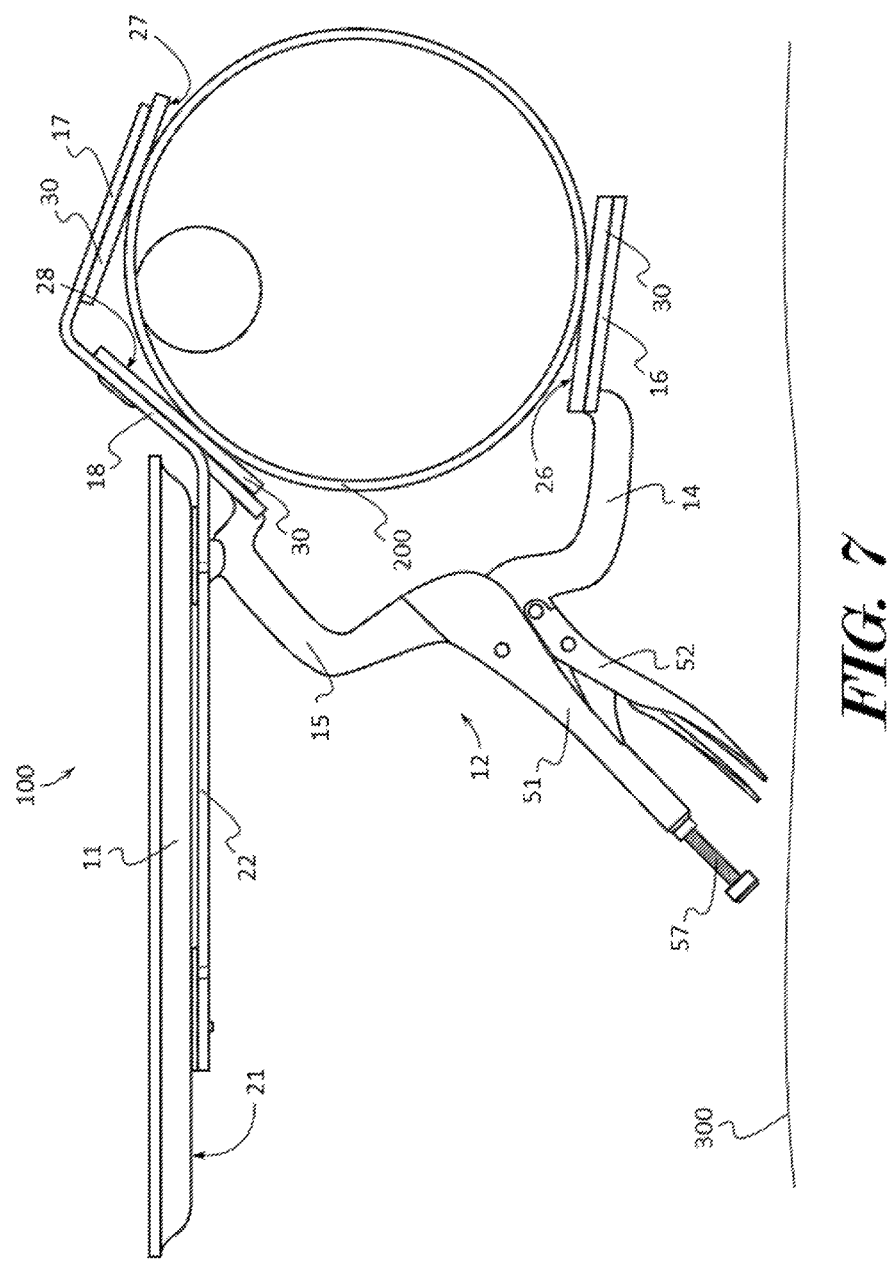
FIG. 7
Amended

LEGLESS PORTABLE WORKTABLE

CROSS REFERENCE TO RELATED APPLICATIONS

This application claims priority to and the benefit of the filing date of U.S. Provisional Application No. 62/054,042, filed on Sep. 23, 2014, entitled "PORTABLE AND ADJUSTABLE WORK TABLE FOR ATTACHING TO PIPE", which is hereby incorporated by reference in its entirety.

FIELD OF THE INVENTION

This patent specification relates to the field of portable worktables. More specifically, this patent specification relates to legless portable worktables which may be affixed to a plurality of structures.

BACKGROUND

In the field of fluid movement, pipelines of different diameters are used to transport said fluids. Constant monitoring and periodic maintenance of the individual pipes are frequently required. Technicians may perform a variety of maintenance operations on the pipes such as to repair existing pipes and gauges, install new pipes and gauges, and to calibrate the gauges attached to the pipes of the pipelines. In order to perform these maintenance operations, the technicians use an assortment of tools and instruments. Heretofore, managing an assortment of tools and instruments in the field is often accomplished by resting the tools on a free-standing table, holding the tools in one or both hands, or enlisting the help of a co-worker. To prevent frequent bending over to retrieve tools from off the ground, technicians may also try to balance tools on a pipe. However, due to the cylindrical nature of pipes, balanced tools commonly fall to the ground.

Therefore, a need exists for novel apparatuses which are able to facilitate the management of a plurality of tools in the field. There is a further need for novel apparatuses which are able to support a plurality of objects, such as tools, off of the ground. A further need exists for novel apparatuses that are portable and adjustable for attaching to a plurality of structures, such as a pipe. Finally, there exists a need for novel apparatuses for supporting a tray above the ground without the use of ground contacting legs.

BRIEF SUMMARY OF THE INVENTION

A legless portable worktable is provided for supporting a tray above the ground without the use of ground contacting legs. In some embodiments, the worktable may comprise: a tray having a tray surface; a conduit clamp coupled to the tray with the conduit clamp comprising a first arm movably coupled to a second arm; a first contact member coupled to the first arm of the conduit clamp; a second contact member and a third contact member coupled to the second arm of the conduit clamp. The first, second, and third contact members may be configured to make contact with and grip a conduit thereby supporting the weight of the tray above the ground.

In further embodiments, a worktable may comprise: a tray having a tray surface; a conduit clamp coupled to the tray with the conduit clamp comprising a first arm movably coupled to a second arm; a first contact member coupled to the first arm of the conduit clamp; a second contact member and a third contact member coupled to the second arm of the conduit clamp; a tension handle, with the first arm moveably coupled to the second arm through the tension handle; and a fixed handle coupled to the second arm. The first arm may be pivoted towards the second arm by pivoting the tension handle towards the fixed handle and the first, second, and third contact members may be configured to make contact with and grip a conduit when the first arm is pivoted towards the second arm thereby supporting the weight of the tray above the ground.

In still further embodiments, the second and third contact members may be angled offset relative to each other and coupled together at an elbow connection.

In still further embodiments, the second and third contact members may be coupled to each other at an elbow connection and oriented to each other with an angle between 1 degree and 179 degrees.

BRIEF DESCRIPTION OF THE DRAWINGS

Some embodiments of the present invention are illustrated as an example and are not limited by the figures of the accompanying drawings, in which like references may indicate similar elements and in which:

FIG. 7—FIG. 7 depicts a side elevation view of an example of a legless portable worktable secured to an object such as a conduit according to various embodiments described herein.

DETAILED DESCRIPTION OF THE INVENTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion. Nevertheless, the specification and claims should be read with the understanding that such combinations are entirely within the scope of the invention and the claims.

Figure 1:
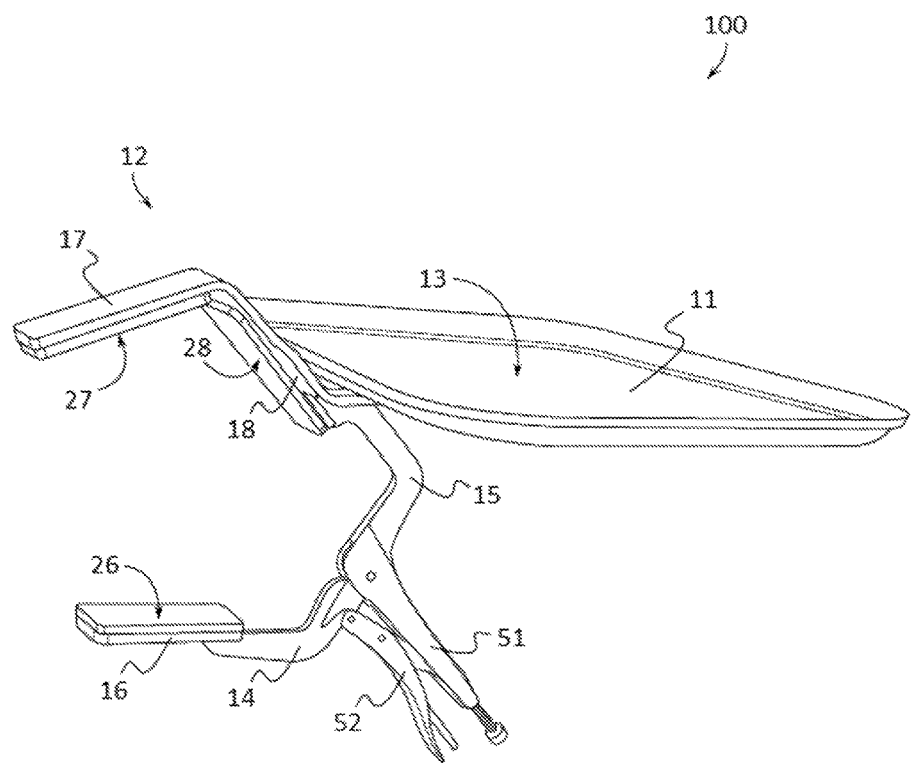
FIG. 1—FIG. 1 depicts a top perspective view of an example of a legless portable worktable according to various embodiments described herein.

For purposes of description herein, the terms "upper", "lower", "left", "right", "rear", "front", "side", "vertical", "horizontal", and derivatives thereof are relative and shall relate to the invention as oriented in FIG. 1. However, one will understand that the invention may assume various alternative orientations and step sequences, except where expressly specified to the contrary. Therefore, the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

New legless portable worktables which may be affixed to a plurality of structures are discussed herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Figure 2:
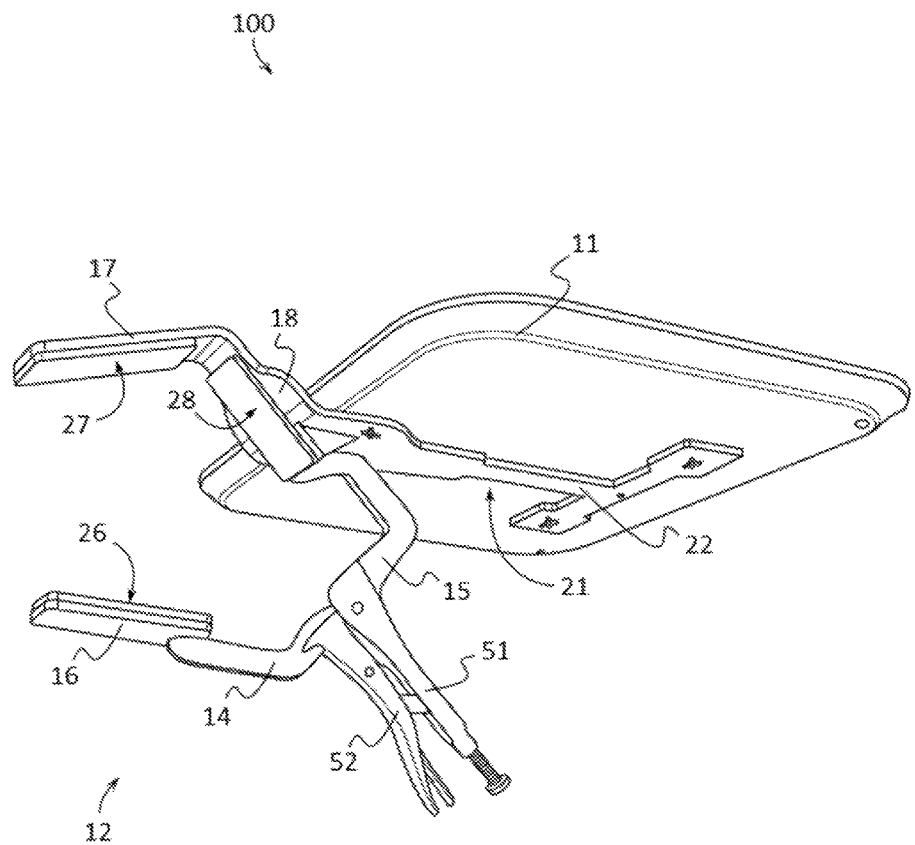
FIG. 2—FIG. 2 illustrates a bottom perspective view of an example of a legless portable worktable according to various embodiments described herein.
Figure 3:
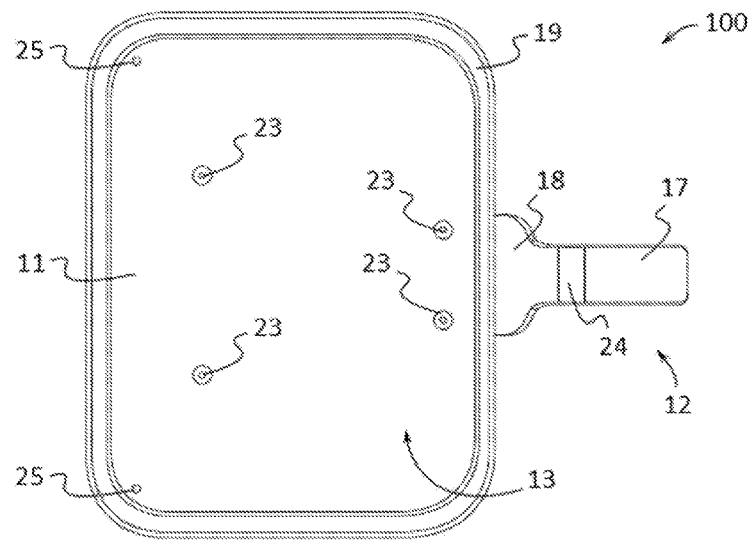
FIG. 3—FIG. 3 shows a top plan view of an example of a legless portable worktable according to various embodiments described herein.
Figure 4:
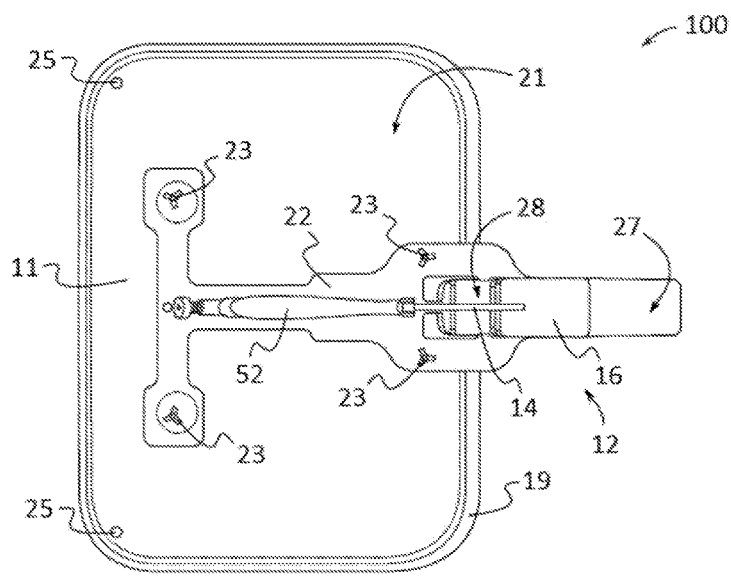
FIG. 4—FIG. 4 depicts a bottom plan view of an example of a legless portable worktable according to various embodiments described herein.
Figure 5:
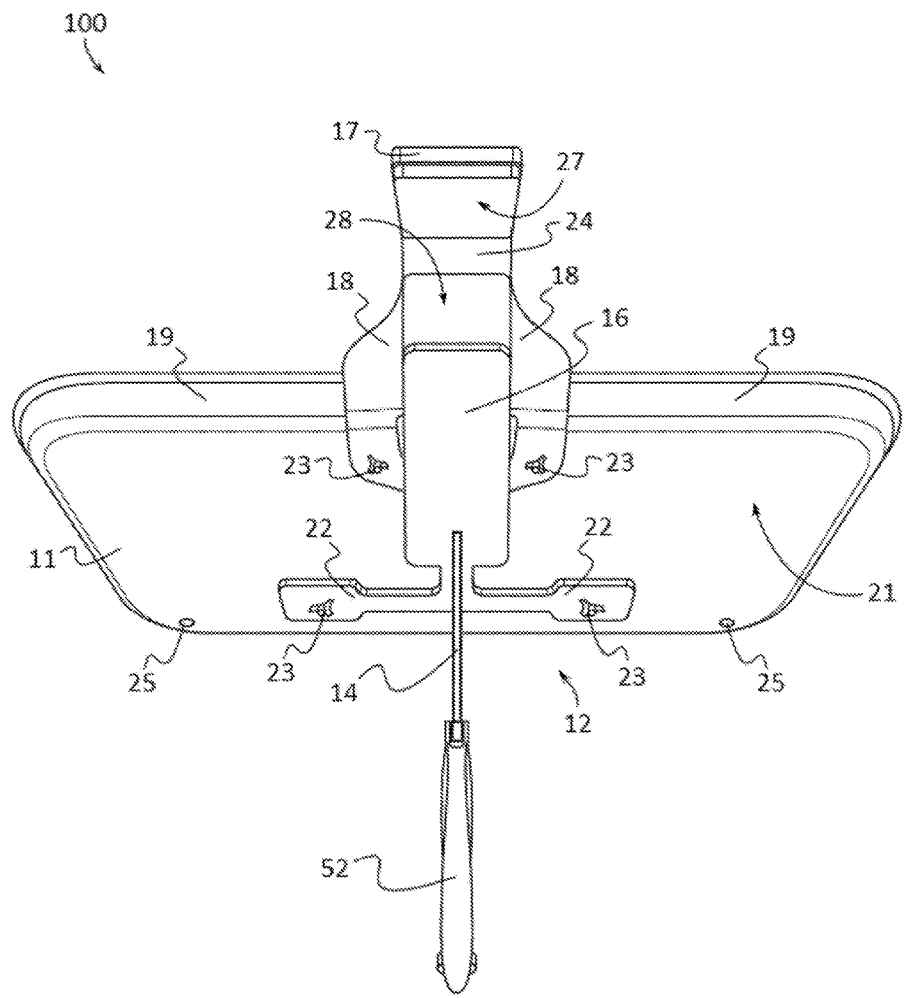
FIG. 5—FIG. 5 illustrates a perspective view of an example of a legless portable worktable according to various embodiments described herein.

The present invention will now be described by example and through referencing the appended figures representing preferred and alternative embodiments. FIGS. 1 and 2 illustrate an example of legless portable worktable ("the worktable") 100 according to various embodiments. In this example, the apparatus 100 comprises a tray 11 that is coupled to a conduit clamp 12. The tray 11 may comprise a tray surface 13 which may provide a surface to support one or more objects which may be placed on the worktable 100. The conduit clamp 12 may comprise a first arm 14 and a second arm 15. The first arm 14 may be movably coupled to the conduit clamp 12, such as to the second arm 15. A first contact member 16 may be coupled to the first arm 14 and a second contact member 17 and a third contact member 18 may be coupled to the second arm 15. In some embodiments, the first 16, second 17, and third 18 contact members may be configured to make contact with and grip an object, such as a conduit 200, thereby using the conduit to support the tray 11 above the ground or any other surface, such as a floor, deck, bulkhead, and the like, below the supporting object.

A tray surface 13 may provide a surface to support one or more objects which may be placed on the worktable 100. As shown in FIGS. 1-7, in some embodiments, the worktable 100 may comprise a tray 11 having a tray surface 13 which may be generally planar and which may optionally be generally rectangular in shape. In further embodiments, the worktable 100 may comprise two or more trays 11 and/or two or more tray surfaces 13. In still further embodiments, all or portions of a tray surface 13 may comprise a concave curve, convex curve, rectangular depression, circular or oval depression, rectangular plateau, circular plateau, or any other surface topography, such as to be optionally tailored to support one or more specific objects. In still further embodiments, a tray 11 and/or a tray surface 13 may be configured in a plurality of sizes and shapes including "T" shaped, "X" shaped, square shaped, cylinder shaped, cuboid shaped, hexagonal prism shaped, triangular prism shaped, or any other geometric or non-geometric shape, including combinations of shapes. It is not intended herein to mention all the possible alternatives, equivalent forms or ramifications of the invention. It is understood that the terms and proposed shapes used herein are merely descriptive, rather than limiting, and that various changes, such as to size and shape, may be made without departing from the spirit or scope of the invention. Optionally, a tray 11 may comprise one or more tray apertures 25 which may pass through the tray surface 13 and tray bottom surface 21 to allow liquids and other substances to pass through the tray 11 without accumulating on the tray surface 13 and/or which may be used to receive and secure portions of a tool or object, such as by inserting the shaft of a screwdriver through a tray aperture 25 until the handle rests on the tray surface 13.

In some embodiments, a tray 11 may comprise a perimeter lip 19 which may generally extend around the perimeter of a tray surface 13. A perimeter lip 19 may extend up and away from a tray surface 13, thereby forming a barrier to prevent an object supported on the tray surface 13 from rolling or falling off of the tray surface 13. In further embodiments, a perimeter lip 19 may extend along an interior portion of a tray surface 13, thereby allowing the perimeter lip 19 to function as a divider or boundary between divide a tray surface 13 into two tray surfaces 13 and/or portions of a tray surface 13.

As perhaps best shown in FIGS. 2, 4-7, a worktable 100 may comprise a conduit clamp 12 coupled to a tray 11. In some embodiments, the second arm 15 of the conduit clamp 12 may be coupled to a bottom surface 21 of the tray 11 at an arm tray attachment point 31. In further embodiments, the second arm 15 of the conduit clamp 12 may be coupled to a perimeter lip 19 of the tray 11. In further embodiments, the third contact member 18 may be coupled to the second arm 15 of the conduit clamp 12 at an arm contact member attachment point 32 and/or be coupled to a bottom surface 21 of the tray 11. In further embodiments, the third contact member 18 may be coupled to the second arm 15 of the conduit clamp 12 and/or be coupled to a perimeter lip 19 of the tray 11. In still further embodiments, a worktable 100 may comprise a tray support 22 which may couple the tray 11 to the conduit clamp 12 at arm tray attachment point 31 and/or to the third contact member 18 at support contact member attachment point 33. In still further embodiments, the tray support 22 may be coupled to the tray 11, such as to the tray bottom surface 21 or perimeter lip 19, and the tray support 22 may also be coupled to the conduit clamp 12, such as to the second arm 15, and/or to the third contact member 18. In some embodiments, a tray 11 may be coupled to a tray support with one or more fasteners 23 and the tray support 22 may also be coupled to the second arm 15, and/or to the third contact member 18 with heat bonding, adhesive, or welding.

Turning now to FIGS. 1, 2, 6, and 7, a second contact member 17 and a third contact member 18 may be coupled to the conduit clamp 12 such as to the second arm 15 of the conduit clamp 12. In some embodiments, the second contact member 17 may be coupled to the third contact member 18 and the third contact member 18 may also be coupled to the second arm 15 of the conduit clamp 12. In further embodiments, the second 17 and third 18 contact members may be angled offset relative to each other and coupled to each other at elbow connection 24. An elbow connection 24 may couple a second contact member 17 to a third contact member 18 to form offset angle 29 (FIG. 6), with offset angle 25 describing the angle that the second contact member 17 and third contact member 18 are angled offset relative to each other. In some embodiments, the second 17 and third 18 contact members may be oriented to each other through an elbow connection 24 with an offset angle 25 of between 45 degrees to 135 degrees. In further embodiments, the second 17 and third 18 contact members may be oriented to each other through an elbow connection 24 with an offset angle 25 of between 1 degree and 179 degrees.

In some embodiments, a first contact member 16, a second contact member 17, and/or a third contact member 18 may comprise a contact surface. In further embodiments, a first contact member 16 may comprise a first contact surface 26, a second contact member 17, may comprise a second contact surface 27, and a third contact member 18 may comprise a third contact surface 28. Each contact surface 26, 27, 28, may be configured to contact an object, such as a conduit 200 (FIG. 8) to which the conduit clamp 12 may be secured to. Each contact member 16, 17, 18, may comprise a non-slip material 30 configured to provide frictional resistance such as, silicone foams, rubber foams, plastic foams, neoprene foam, latex foam rubber, polyurethane foam rubber, rubber, synthetic rubber, polymer, silicone, resilient plastic, grip tape, texturing, or any other material configured to provide frictional resistance. In some embodiments, each contact member 16, 17, 18, may comprise or be coupled to a non-slip material 30 which is configured to provide frictional resistance and which may form a respective contact surface 26, 27, 28, thereby forming a non-slip contact surface 26, 27, 28 on a contact member 16, 17, 18. In further embodiments, one or more contact surfaces 26, 27, 28 and/or a contact members 16, 17, 18 may be configured with a generally planar shape, curved shape, rounded shape, ridges, grooves or other texturing, or any other shape or texture to facilitate the contact and frictional resistance between a contact surface 26, 27, 28, and an object that the contact surface 26, 27, 28, may be placed in contact with.

Figure 6:
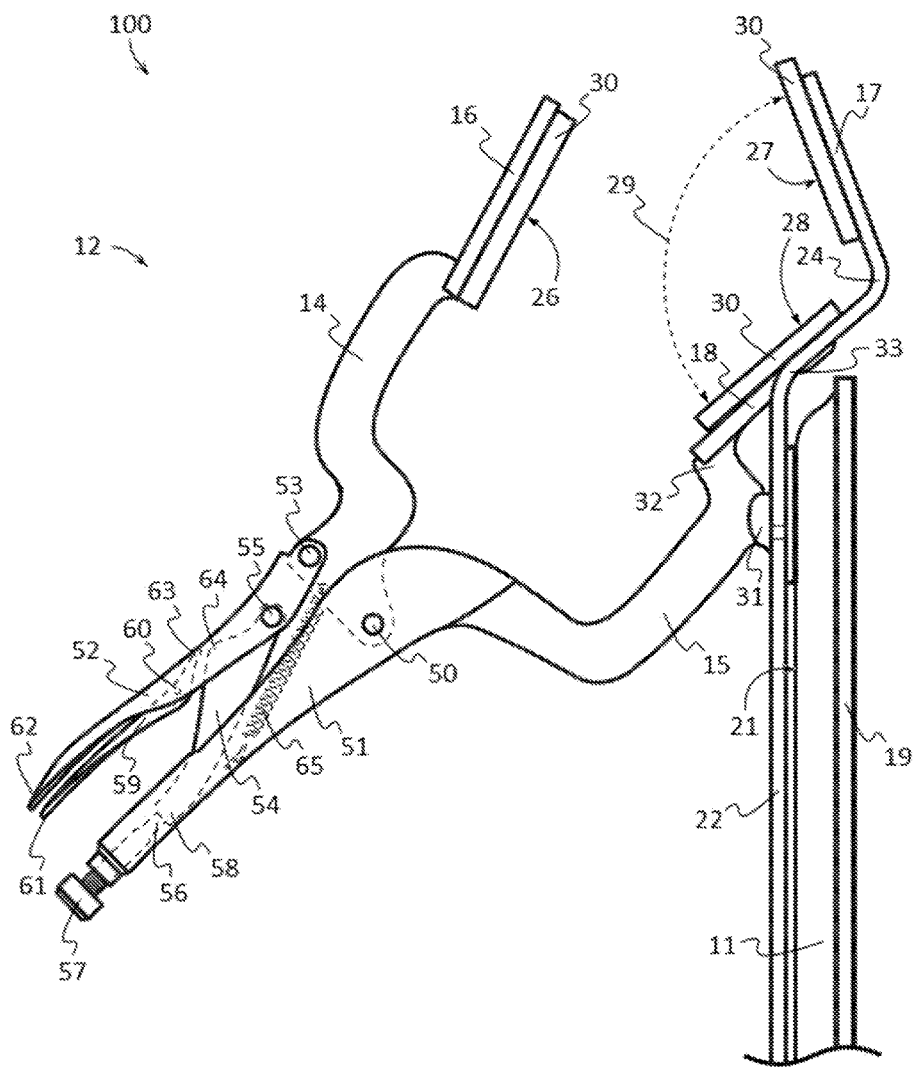
FIG. 6—FIG. 6 shows a side elevation view of an example of a legless portable worktable according to various embodiments described herein.

In some embodiments, the conduit clamp 12 may comprise a first arm 14 movably coupled to a second arm 15 so that the first arm 14 may pivot towards and/or away from the second arm 15. In alternative embodiments, the conduit clamp 12 may comprise a second arm 15 movably coupled to a first arm 14 so that the second arm 15 may pivot towards and/or away from the first arm 14. Referring now to FIG. 6, the conduit clamp 12 may comprise a second arm 15 to which a first arm 14 is pivotally connected to the second arm 15 by a pivot pin 50, such as a rivet or other fastener, for retaining the arms 14 and 15 in an assembled relationship. The second arm 15 may be coupled or integrally formed with a fixed handle 51, and the first arm 14 may be pivotally connected to a tension handle 52. The pivoted connection between the arm 14 and the handle 52 may comprise a rivet-like pivot pin 53 or any other fastener.

The handles 51 and 52 may be connected by means of a toggle link 54 having one end pivotally connected by a rivet-like pivot pin 55 to the handle 52, and having its other end abutting the inner end 56 of an adjustment screw 57 that may be threaded into the end of the handle 51 remote from the arms 14, 15. The end 58 of the toggle-link 54 may be guidingly restrained adjacent to the end 56 of the screw 57 in and in alignment with the end 56 of the screw 57. The arrangement is such that for a given rotational adjustment of the screw 57 in the handle 51, manual gripping of the handles 51 and 52 to urge the handles 51 and 52 toward each other will, assuming the end 58 of the toggle link 54 remains in constant abutting relationship to the end 56 of the screw 57, cause pivotal movement of the first arm 14 towards the second arm 15 with great mechanical advantage.

The structure of the conduit clamp 12 serves to enable the placement of an object, such as a conduit 200 (FIG. 7) between the contact surfaces 26, 27, 28, of the arms 14, 15, and the application of a very strong gripping force on the object by the arms 14, 15, by manually gripping the handles 51 and 52 together, and when the position of the screw 57 has been appropriately preselected in relation to the size of the object gripped, the conduit clamp 12 will firmly grip the object and the handles 51, 52, will remain in the gripping position.

Once the handles 51, 52, are brought together into the gripping position, the object may remain tightly gripped between the first contact surface 26 of the first arm 14 and the second 27 and third 28 contact surfaces of the second arm 15. Typically, the object may be gripped so tightly when the conduit clamp 12 is so applied that considerable difficulty in releasing the object will be encountered if the release is attempted by unscrewing the screw 57, or by attempting to spread the handles 51 and 52 apart. To facilitate the release of the object, a tension handle 52 may be coupled to a release lever 59 which may be pivotally coupled to the handle 52 at pivot pin 60 so that by squeezing the ends 61 and 62 of the lever 59 and the handle 52, respectively, together causes a second end 63 of the lever 59 to bear against the lobe 64 of the toggle link 54 and thereby freeing the handles 51 and 52 and allowing the first contact surface 26 of the first arm 14 to be moved away from the second 27 and third 28 contact surfaces of the second arm 15 to release the object.

In some embodiments, the conduit clamp 12 may include a tension spring 65 for urging an opening movement of the arms 14, 15, such that the arms 14, 15, may be held apart for convenient insertion of an object between the first contact surface 26 of the first arm 14 and the second 27 and third 28 contact surfaces of the second arm 15.

FIG. 7 depicts a side elevation view of an example of a legless portable worktable 100 secured to an object such as a conduit 200 according to various embodiments described herein. In this illustration, the worktable 100 is shown supporting a tray 11 above the ground 300 without the use of ground contacting legs or any other element of the worktable 100 contacting the ground. The worktable 100 may comprise a tray 11; a conduit clamp 12 coupled to the tray 11 with the conduit clamp 12 comprising a first arm 14 movably coupled to a second arm 15; a first contact member 16 coupled to the first arm 14 of the conduit clam; and a second contact member 17 and a third contact member 18 coupled to the second arm 15 of the conduit clamp 12. The first 16, second 17, and third 18 contact members may respectively comprise a first 26, second 27, and third 28 contact surface which may make contact with and grip a conduit 200, or any other object, thereby supporting the weight of the tray 11 above the ground 300.

In some embodiments, the first contact member 16 may be configured to oppose the second 17 and third 18 contact members allowing the first contact member to be positioned on an opposite side of an object, such as a conduit 200, than the second 17 and third 18 contact members. When the tension handle 52 is squeezed towards the fixed handle 51, the first arm 14 may be pivoted towards the second arm 15, thereby pivoting the first contact member 16 towards the second 17 and third 18 contact members to grip the conduit 200. In further embodiments, the screw 57 may be rotated to adjust the distance the first arm 14 may be pivoted towards the second arm 15, and therefore the amount of gripping force that may be exerted on the conduit 200.

In some embodiments, and as shown in FIGS. 1-7, the conduit clamp 12 may be configured to secure the worktable 100 to generally cylindrical or circular objects such as a conduit 200 or pipe. In further embodiments, the conduit clamp 12 may be configured to secure the worktable 100 to objects comprising a plurality of different sizes and shapes such as conduits 200, pipes, boards, beams, posts, poles, walls, fences, portions of vehicles, trees, or any other object to support a tray 11 above the ground 300 without the use of ground contacting legs or any other element of the worktable 100 contacting the ground. In these and further embodiments, the second 17 and third 18 contact members may be angled offset relative to each other and coupled to each other at elbow connection 24. An elbow connection 24 may couple a second contact member 17 to a third contact member 18 to form offset angle 25 (FIG. 6), with offset angle 25 describing the angle that the second contact member 17 and third contact member 18 are angled offset relative to each other. In some embodiments, the second 17 and third 18 contact members may be oriented to each other through an elbow connection 24 with a relatively larger offset angle 25 thereby optimizing the ability of the conduit clamp to grip and secure to objects, such as conduits 200, with larger diameters. In other embodiments, the second 17 and third 18 contact members may be oriented to each other through an elbow connection 24 with a relatively smaller offset angle 25 thereby optimizing the ability of the conduit clamp to grip and secure to objects, such as conduits 200, with smaller diameters.

While some materials have been provided, in other embodiments, the elements that comprise the worktable 100 such as the tray 11, conduit clamp 12, first contact member 16, second contact member 17, and/or third contact member 18 may be made from durable materials such as aluminum, steel, other metals and metal alloys, wood, hard rubbers, hard plastics, fiber reinforced plastics, carbon fiber, fiber glass, resins, polymers or any other suitable materials including combinations of materials. Additionally, one or more elements may be made from or comprise durable and slightly flexible materials such as soft plastics, silicone, soft rubbers, or any other suitable materials including combinations of materials. In some embodiments, one or more of the elements that comprise the worktable 100 may be coupled or connected together with heat bonding, chemical bonding, adhesives, clasp type fasteners, clip type fasteners, rivet type fasteners, threaded type fasteners, other types of fasteners, or any other suitable joining method. In other embodiments, one or more of the elements that comprise the worktable 100 may be coupled or removably connected by being press fit or snap fit together, by one or more fasteners such as hook and loop type or Velcro® fasteners, magnetic type fasteners, threaded type fasteners, sealable tongue and groove fasteners, snap fasteners, clip type fasteners, clasp type fasteners, ratchet type fasteners, a push-to-lock type connection method, a turn-to-lock type connection method, slide-to-lock type connection method or any other suitable temporary connection method as one reasonably skilled in the art could envision to serve the same function. In further embodiments, one or more of the elements that comprise the worktable 100 may be coupled by being one of connected to and integrally formed with another element of the worktable 100.

Although the present invention has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present invention, are contemplated thereby, and are intended to be covered by the following claims.

What is claimed is:

1. A legless portable worktable for supporting a tray above the ground without the use of ground contacting legs, the work table comprising:
   a. a tray coupled to a tray support, the tray having a tray surface;
   b. a conduit clamp comprising a first arm pivotally coupled to a second arm with a pivot pin;
   c. said first arm having a unitary first contact member coupled to said first arm of the conduit clamp and said first contact member having a planar contact surface;
   d. said second arm having a second contact member and a third contact member coupled to said second arm of the conduit clamp with said second contact member and said third contact member opposing said unitary first contact member on the first arm, and wherein the second and third contact members are angled offset relative to each other and coupled together at an elbow connection; and
   e. said tray support is integrally formed with said second arm and said tray support protrudes outwardly away from the second arm at a position between the pivot pin and the third contact member.

2. The worktable of claim 1, wherein the second and third contact members are coupled to each other at an elbow connection and oriented to each other with an angle between 1 degrees to 179 degrees.

3. The worktable of claim 1, further comprising a tension handle, and wherein the first arm is moveably coupled to the second arm through the tension handle.

4. The worktable of claim 3, wherein the conduit clamp comprises a fixed handle, and wherein the first arm is pivoted towards the second arm by pivoting the tension handle towards the fixed handle.

5. The worktable of claim 1, wherein the first contact member comprises a first contact surface, wherein the second contact member comprises a second contact surface, and wherein the third contact member comprises a third contact surface.

6. The worktable of claim 5, wherein the first, second, and third contact surfaces are made from a non-slip material.

7. The worktable of claim 1, wherein the tray comprises a perimeter lip.

8. The worktable of claim 1, wherein the tray comprises a tray aperture.

* * * * *